(12) United States Patent
Gaudet et al.

(10) Patent No.: US 7,195,713 B2
(45) Date of Patent: Mar. 27, 2007

(54) MATERIAL FOR CHROMATOGRAPHY

(75) Inventors: Gregory T. Gaudet, Acton, MA (US); Agathagelos Kyrlidis, Malden, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 11/348,538

(22) Filed: Feb. 6, 2006

(65) Prior Publication Data

US 2006/0186047 A1 Aug. 24, 2006

Related U.S. Application Data

(62) Division of application No. 10/884,090, filed on Jul. 2, 2004, now Pat. No. 7,008,534, which is a division of application No. 09/944,064, filed on Aug. 31, 2001, now Pat. No. 6,787,029.

(51) Int. Cl.
*B01D 15/08* (2006.01)
(52) U.S. Cl. ................... 210/635; 210/656; 210/198.2; 210/502.1
(58) Field of Classification Search ................ 210/635, 210/656, 198.2, 502.1; 502/416, 417, 418, 502/437; 264/29.5; 428/707
See application file for complete search history.

(56) References Cited

U.S. PATENT DOCUMENTS

| | | | |
|---|---|---|---|
| 1,968,874 A | 8/1934 | Morrell | 252/3 |
| 1,989,107 A | 1/1935 | Morrell | 252/3 |
| 2,527,595 A | 10/1950 | Swallen et al. | 106/56 |
| 2,997,744 A | 8/1961 | Stoddard et al. | 18/55 |
| 3,219,731 A | 11/1965 | Etzel et al. | 264/29 |
| 3,346,678 A | 10/1967 | Ohlgren | 264/29 |
| 3,619,430 A | 11/1971 | Hiratsuka et al. | 264/29 |
| 3,718,720 A | 2/1973 | Lambdin, Jr. et al. | 264/29 |
| 3,810,963 A | 5/1974 | Benton et al. | 264/29 |
| 3,840,485 A | 10/1974 | Brown et al. | 260/28 |
| 3,859,421 A | 1/1975 | Hucke | 423/445 |
| 3,869,302 A | 3/1975 | Shea et al. | 117/46 |
| 3,869,409 A | 3/1975 | Bebris et al. | 252/446 |
| 3,917,806 A | 11/1975 | Amagi et al. | 423/449 |
| 3,927,187 A | 12/1975 | Luhleich et al. | 423/448 |
| 3,960,761 A | 6/1976 | Burger et al. | 252/421 |
| 3,988,919 A | 11/1976 | Talmi et al. | 73/23.1 |
| 3,993,738 A | 11/1976 | Overholser et al. | 423/448 |
| 4,009,143 A | 2/1977 | Luhleich et al. | 260/38 |
| 4,023,979 A | 5/1977 | Luhleich et al. | 106/284 |
| 4,029,600 A | 6/1977 | Schmitt, Jr. et al. | 252/444 |
| 4,059,682 A | 11/1977 | Luhleich et al. | 423/448 |
| 4,060,592 A | 11/1977 | Luhleich et al. | 423/448 |

(Continued)

FOREIGN PATENT DOCUMENTS

DE 3837724 6/1989 ............... 210/198.2

(Continued)

OTHER PUBLICATIONS

Mikes, Laboratory Handbook of Chromatographic and Allied Methods, Ellis Horwood Limited, New York, 1979, pp. 218-224 and 385-391.

(Continued)

*Primary Examiner*—Ernest G. Therkorn

(57) ABSTRACT

Granulated products are provided and include carbonaceous particles and a carbonized agent or binder. The agent or binder is preferably a synthetic resin, pitch component, or mixture thereof. Packing materials for packing columns used in chromatographic separations are also provided as are methods of chromatographic separation using the materials. In addition, methods are provided to provide a variety of different types of carbonaceous products. A variety of chemical groups can be, prior to heat-treatment and/or thereafter, attached to the granules to form modified granules.

14 Claims, 1 Drawing Sheet

SEM Picture of Particles SP-5 taken under 5000x magnification.

U.S. PATENT DOCUMENTS

| | | | |
|---|---|---|---|
| 4,081,370 A | 3/1978 | Schmitt, Jr. et al. | 210/39 |
| 4,089,934 A | 5/1978 | Akiyoshi et al. | 423/448 |
| 4,132,671 A | 1/1979 | Deininger et al. | 252/445 |
| 4,175,037 A | 11/1979 | Benney et al. | 210/31 |
| 4,225,463 A | 9/1980 | Unger | 252/445 |
| 4,492,771 A | 1/1985 | Hasegawa et al. | 502/420 |
| 4,550,015 A | 10/1985 | Korb et al. | 423/445 |
| 4,619,805 A | 10/1986 | Dias et al. | 264/29.5 |
| 4,704,327 A | 11/1987 | Schieber | 428/338 |
| 4,888,215 A | 12/1989 | Nakada et al. | 427/215 |
| 4,929,404 A | 5/1990 | Takahashi et al. | 264/29.5 |
| 5,098,784 A | 3/1992 | Ichikawa | 428/332 |
| 5,270,280 A | 12/1993 | Ichikawa et al. | 502/437 |
| 5,272,126 A | 12/1993 | Ichikawa et al. | 502/429 |
| 5,370,794 A | 12/1994 | Obayashi | 210/198.2 |
| 5,476,989 A | 12/1995 | Mimori et al. | 588/20 |
| 5,554,739 A | 9/1996 | Belmont | 534/885 |
| 5,622,557 A | 4/1997 | Mahmud et al. | 106/712 |
| 5,747,562 A | 5/1998 | Mahmud et al. | 523/215 |
| 5,749,950 A | 5/1998 | Mahmud et al. | 106/475 |
| 5,820,967 A | 10/1998 | Gadkaree | 428/116 |
| 5,830,930 A | 11/1998 | Mahmud et al. | 523/215 |
| 5,863,323 A | 1/1999 | Mahmud et al. | 106/712 |
| 5,869,550 A | 2/1999 | Mahmud et al. | 523/215 |
| 5,877,238 A | 3/1999 | Mahmud et al. | 523/215 |
| 5,879,650 A | 3/1999 | Kaul et al. | 423/449.1 |
| 5,904,762 A | 5/1999 | Mahmud et al. | 106/475 |
| 5,916,934 A | 6/1999 | Mahmud et al. | 523/215 |
| 5,919,841 A | 7/1999 | Mahmud et al. | 523/351 |
| 5,948,835 A | 9/1999 | Mahmud et al. | 523/215 |
| 5,977,213 A | 11/1999 | Mahmud et al. | 523/351 |
| 6,008,271 A | 12/1999 | Hosoda et al. | 523/218 |
| 6,039,823 A | 3/2000 | Grasso et al. | 156/89.26 |
| 6,057,387 A | 5/2000 | Mahmud et al. | 523/215 |
| 6,211,279 B1 | 4/2001 | Mahmud et al. | 524/492 |
| 6,364,944 B1 * | 4/2002 | Mahmud et al. | 106/475 |
| 6,863,713 B1 * | 3/2005 | Ghosal et al. | 95/117 |
| 2002/0056686 A1 * | 5/2002 | Kyrlidis et al. | 210/656 |

FOREIGN PATENT DOCUMENTS

| | | | | |
|---|---|---|---|---|
| JP | 54041296 | 4/1979 | | 210/198.2 |
| JP | 54046247 | 4/1979 | | 210/198.2 |
| JP | 60195012 | 10/1985 | | 210/198.2 |
| JP | 61169127 | 7/1986 | | 210/198.2 |
| JP | 62041709 | 2/1987 | | 210/198.2 |
| JP | 62070216 | 3/1987 | | 210/198.2 |
| JP | 62072508 | 4/1987 | | 210/198.2 |
| JP | 62109821 | 5/1987 | | 210/198.2 |
| JP | 63147809 | 6/1988 | | 210/198.2 |
| JP | 1046645 | 2/1989 | | 210/198.2 |
| JP | 1053153 | 3/1989 | | 210/198.2 |
| JP | 1079070 | 3/1989 | | 210/198.2 |
| JP | 1294573 | 11/1989 | | 210/198.2 |
| JP | 2122828 | 5/1990 | | 210/198.2 |
| JP | 02193066 | 7/1990 | | 210/198.2 |
| JP | 3106443 | 5/1991 | | 210/198.2 |
| JP | 404169844 A | 11/1991 | | 210/198.2 |
| JP | 5031360 | 2/1993 | | 210/198.2 |
| WO | WO 92/13983 | 8/1992 | | 210/198.2 |
| WO | WO 95/01838 | 1/1995 | | 210/198.2 |
| WO | WO 96/37547 | 11/1996 | | 210/198.2 |
| WO | WO 98/13418 | 4/1998 | | 210/198.2 |
| WO | WO 98/13428 | 4/1998 | | 210/198.2 |

OTHER PUBLICATIONS

International Search Report for PCT/US02/27296.

* cited by examiner

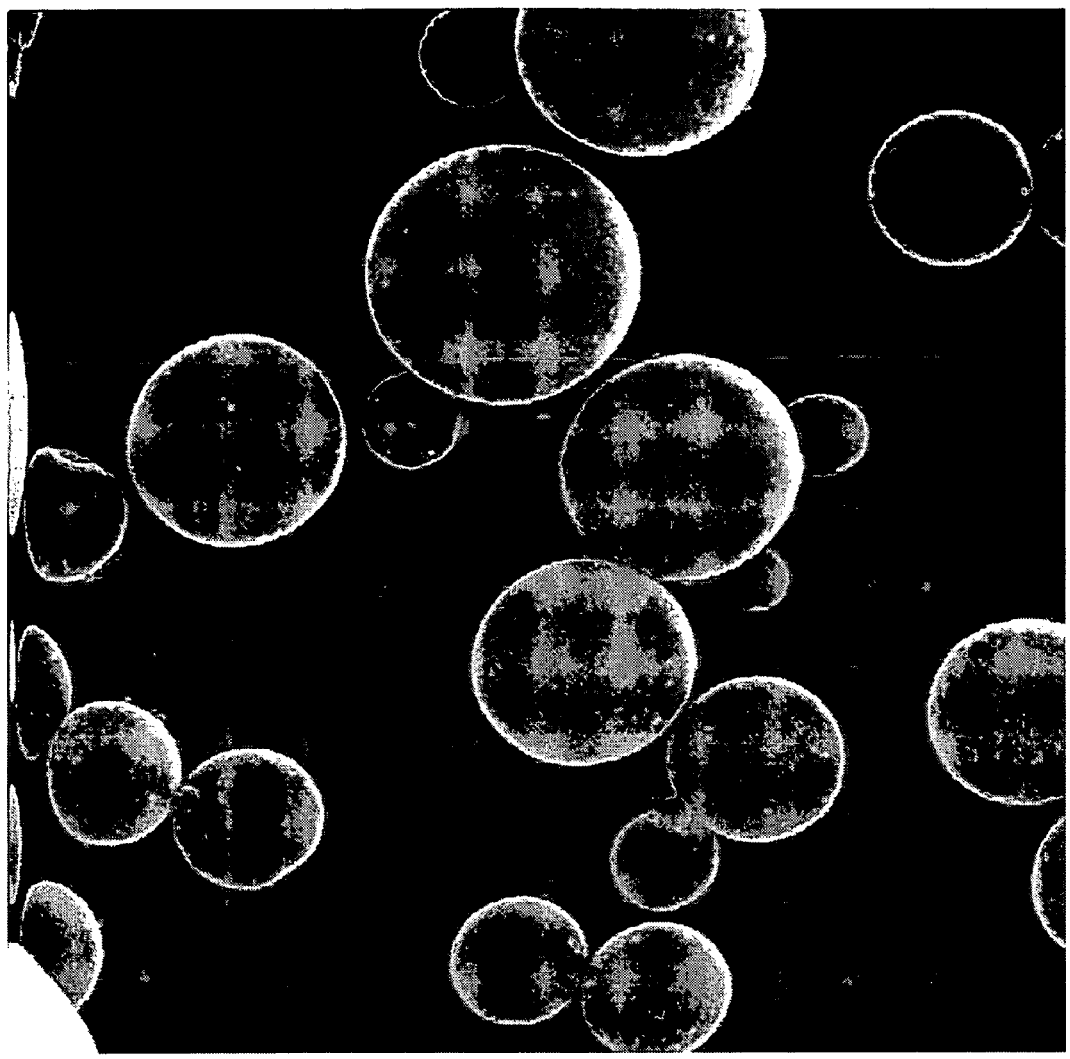
Figure 1. SEM Picture of Particles SP-5 taken under 5000x magnification.

MATERIAL FOR CHROMATOGRAPHY

This application is a divisional of U.S. patent application Ser. No. 10/884,090, filed Jul. 2, 2004 now U.S. Pat. No. 7,008,534, which in turn is a divisional of U.S. patent application Ser. No. 09/944,064, filed Aug. 31, 2001, now U.S. Pat. No. 6,787,029 B2.

BACKGROUND OF THE INVENTION

The present invention relates to a packing material for chromatographic separations and to a method of manufacturing the same. More particularly, the present invention relates to a packing material for liquid chromatography produced by mixing a carbon product, such as carbon black with a synthetic resin and/or a pitch component, granulating the mixture, and heat treating the resultant granules. The present invention also relates to methods of chromatographic separation that employ the granules.

Conventionally, packing materials for liquid chromatography have included silica gel materials and synthetic resin-based materials. However, problems such as chemical stability, including solubility, have resulted in silica gel-based materials exhibiting poor durability as a packing material.

In chromatography and other separation methods, there is a certain amount of selectivity that is necessary in order for the stationary phase to separate the various components in a mixture. For this reason, carbon products, such as carbon black, have not been used as a standard stationary phase in separation systems because carbon is a strong non-specific adsorbent. This has been disappointing in the past, because carbon products, otherwise, would have many advantages over commercially available adsorbents. For instance, there are no corrosion problems with carbon products nor are there any swelling problems with carbon products. In addition, carbon products can be subjected to large temperature ranges and/or extreme pressures which would be beneficial for certain types of adsorptions, such as temperature swings used in some types of chromatography. In addition, with certain separation processes used in the production of biopharmaceuticals for clinical applications, the sterilization requirements or recommendations provide for the use of hot sodium hydroxide. With such sterilization procedures, the current separation devices such as silica columns, cannot be used. Further, the polymeric columns such as cellulose polymers, are chemically but not physically stable to such sterilization treatments.

U.S. Pat. No. 5,270,280 relates to the use of carbon black packing materials for liquid chromatography, wherein the carbon blacks have specific dimensional ratios, specific particle diameters and surface areas, and specific micropore volumes. The patent is incorporated herein in its entirety by reference. The methods of making the packing material according to U.S. Pat. No. 5,270,280 include granulating a carbon black-containing mixture and heat-treating the granules at a high temperature in the range of from 800° C. to about 3000° C., in an inert atmosphere. The high temperature heat-treatment is most likely necessary to carbonize and graphitize the binder material in order to form a graphitic layer. According to the patent, if the temperature is below 800° C., the graphitization of the binder is not sufficient, resulting in the packing material having insufficient strength. While the patent describes the packing material as providing improved mechanical durability and separating characteristics, a need still exists for an improved liquid chromatography packing material that has improved mechanical durability and improved separating properties.

It is desired to provide an improved liquid chromatographic packing material and a method of producing such a material which does not require a high temperature heat-treatment or graphitization step.

In addition, it is desired to provide a method of chromatographic separation that provides improved separation of sample components.

SUMMARY OF THE INVENTION

The present invention relates to an improved chromatographic packing material made of carbonaceous particle-containing granules preferably having at least one organic group attached thereto. The granules include carbonaceous particles and the carbonized product of a carbonizable synthetic resin, pitch component, or both. Preferred granules include carbon black particles having attached organic groups and a carbonized synthetic resin, pitch component, or both.

The present invention further relates to a process for making the packing material of the present invention and includes: mixing carbonaceous particles with at least one synthetic resin, pitch component, or both, and with at least one organic or aqueous solvent, to form a mixture; granulating the mixture to form granules; heating the granules at a relatively low temperature of from about 400° C. to less than 800° C. to carbonize the synthetic resin, pitch component, or both, and to evaporate the solvent. Once formed, the packing material can be further customized for specific uses by attaching an organic group or groups to the carbon surface.

The carbonized synthetic resin, pitch component, or both, preferably acts to strongly bind the carbonaceous particles into a strong granule, very differently than the temporary binding action of pelletizing or binding agents designed to facilitate ready dispersal of carbon black particles from a pelletized carbon black.

The packing materials of the present invention preferably exhibit excellent mechanical durability and preferably provide improved separating abilities in chromatographic separation applications. The surface-modified granular packing materials of the present invention are particularly useful in liquid chromatographic separation applications.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

It is to be understood that both the foregoing general description and the following detailed description are exemplary and explanatory only and are intended to provide further explanation of the present invention, as claimed.

BRIEF DESCRIPTION OF THE DRAWING

FIG. 1 is a microphotograph (at 5,000× magnification) of chromatographic packing materials of the present invention.

DETAILED DESCRIPTION OF THE PRESENT INVENTION

The present invention relates to a chromatographic packing material. The carbonaceous particles are preferably bound together with the carbonized product (e.g., binder) of at least one synthetic resin, at least one pitch component, or both.

The carbonaceous particles that can be treated to form the packing material of the present invention are preferably selected from graphite powder, graphite fibers, carbon fibers, carbon cloth, vitreous carbon products, activated carbon products, and carbon black. A preferred carbonaceous particulate material is carbon black. In addition, the carbonaceous particles can include, but are not limited to, carbon aerogels, pyrolized ion exchange resins, pyrolized polymer resins, meso carbon microbeads, pelleted carbon powder, nanotubes, buckey balls, silicon-treated carbon black, silica-coated carbon black, metal-treated carbon black, densified carbon black, activated carbon or other carbonaceous material obtained by the pyrolysis of cellulosic, fuel oil, polymeric, or other precursors and combinations thereof or activated versions thereof. The carbonaceous particles can also include, but are not limited to, material obtained by the compaction of small carbon particles and other finely divided forms of carbon as long as the carbonaceous particles have the ability to adsorb at least one adsorbate and is preferably capable of being chemically modified in accordance with the present invention. The carbonaceous particles can also be a waste product or by-product of carbonaceous material obtained by pyrolysis.

In addition, the carbonaceous particles can be an aggregate having at least one carbon phase and at least one silicon-containing species phase. The aggregate can be one or more of the aggregates described in U.S. Pat. Nos. 6,008,271; 5,977,213; 5,948,835; 5,919,841; 5,904,762; 5,877,238; 5,869,550; 5,863,323; 5,830,930; 5,749,950; 5,622,557; and 5,747,562. Furthermore, the aggregates described in WO 98/47971; WO 96/37547; and WO 98/13418 can also be used, and each of these patents and publications is incorporated herein in its entirety by reference.

The carbonaceous particles can be a carbon black which is at least partially coated with silica. Examples of such an aggregate are described in U.S. Pat. No. 5,916,934 and WO 98/13428 which are incorporated herein in their entireties by reference.

Besides the above-described aggregates, the carbonaceous particles can also be an aggregate having at least a carbon phase and a metal-containing species phase as described in PCT Publication WO 98/47971 which is incorporated herein in its entirety by reference.

In addition, the aggregates and methods of making multiphase aggregates from U.S. Pat. Nos. 6,211,279; and 6,057,387; and U.S. patent application Ser. No. 09/453,419 can be used, and all of these patents and application are incorporated herein in their entireties by reference. Additionally, the aggregates of U.S. Patent Application No. 60/163,716 having attached polymer groups can be used as can the modified pigments described in U.S. Patent Application No. 60/178,257, both of which applications are also incorporated herein in their entireties by reference.

Preferably, the carbonaceous particles are activated carbon or carbon black capable of adsorbing an adsorbate. Commercial examples of carbon black include, but are not limited to, Black Pearls® 2000 carbon black, Black Pearls® 430 carbon black, Black Pearls® 900 carbon black, and Black Pearls® 120 carbon black, all available from Cabot Corporation. Commercial examples of activated carbon include Darco S51, available from Norit; Sorbonorit 3, available from Norit; and BPL activated carbon from Calgon. The carbonaceous particles modified by the procedures described herein may be a microporous or mesoporous activated carbon in granular or pellet form; a carbon black of different structures in fluffy or pelleted form; or any other carbonaceous particles whose applicability to this invention is apparent to those skilled in the art, such as carbon fibers or carbon cloth. The choice of carbonaceous particles used eventually depends on a variety of different factors, including the application for which it is intended. Each of these types of carbonaceous particles has the ability to adsorb at least one adsorbate. A variety of BET surface areas, micropore volumes, and total pore volumes are available depending on the desired end use of the carbonaceous material.

The carbonaceous particles used to form the packing material of the present invention preferably comprise particles having an average particle diameter of from about 12 to about 40 nanometers (nm) prior to granulation, for example, from about 12 to about 30 nm, and a specific surface area of from about 50 to about 550 $m^2/g$, for example, from about 80 to about 250 $m^2/g$. A preferred particulate material is a carbon black having these properties. The carbonaceous particles used to form the mixture preferably have a DBP oil adsorption of from about 50 to about 200 ml/100 g, for example, from about 80 to about 150 ml/100 g.

The synthetic resin and/or pitch component preferably attains a firm bonding among the carbonaceous particles and preferably acts as a binder. The synthetic resin and/or pitch component is preferably easily carbonized by heating. Exemplary synthetic resins that can be used according to the present invention include phenolic resins, furan resins, furfural resins, divinyl benzene resins, urea resins, and mixtures thereof.

If a pitch component is used, it is preferably toluene-soluble or benzene-soluble. The pitch component is preferably a component of petroleum pitches, coal-tar pitches, or liquefied oil from coal.

Both a pitch component and a synthetic resin component can be used together, for example, whereby the pitch component is preferably combined with the synthetic resin before contacting the carbonaceous particles. The synthetic resin and pitch component mixture can preferably be used in an amount of from about 5 parts by weight to about 500 parts by weight, for example, from about 40 parts by weight to about 300 parts be weight, per 100 parts by weight of carbonaceous particles.

To facilitate homogenization of the carbonaceous particles with the synthetic resin, pitch component, or both, it is preferable to disperse the components in a suitable solvent. Preferably, the solvent is aqueous as opposed to non-aqueous or solvent based. Exemplary solvents that can be used include, but are not limited to, water, alcohols such as methanol, ethanol, propanol, or the like, organic solvents having an aromatic group such as benzene, toluene, or the like, and general organic solvents such as acetone, methylethylketone, or the like. With water-compatible synthetic resins, water is a preferred solvent because of its ease of handling and processing. Preferably, the solvent is used in an amount of from about 70 to about 400 parts by weight per 100 parts by weight of the combined carbonaceous particles and synthetic resin/pitch component. For carbonaceous particles having particle diameters of from about 12 to about 30 nm, specific surface areas of from about 80 to about 200 $m^2/g$, and DBP oil adsorptions of from about 80 to about 200 ml/100 g, about 0.60 part by weight solvent can be used, based on the weight of the carbonaceous particles.

Carbonaceous particles having organic groups attached thereto can in and of themselves be used as readily dispersible carbonaceous particles, even in the absence of a surfactant, and are preferred according to some embodiments of the present invention.

According to a preferred method of the present invention, a process for producing a material for chromatography is provided and includes mixing about 100 parts by weight of carbonaceous particles with: from about 10 to about 500 parts by weight of at least one of a synthetic resin that can be carbonized by heating, and a pitch component; and an organic or aqueous solvent. Preferably, from about 40 to about 250 parts by weight synthetic resin and/or pitch component are used per 100 parts by weight carbonaceous particles. The mixture can be formed by any manner used to combine the components. The mixture can then be granulated to form granules. The granulation can be accomplished by a wet (emulsion) granulation technique or by a spray drying granulation technique. Any of the granulation techniques described in U.S. Pat. No. 5,270,280 can be used. The granules are then subjected to conditions sufficient to carbonize the synthetic resin and/or pitch component and to evaporate the solvent. After carbonizing the granules, they can be further modified by attaching organic groups to the granules.

The granulating method may be a spray drying granulation method, a submerged granulating method (an emulsion granulating method), or any other suitable granulating method that results in spherical granules. According to a preferred spray granulation technique, granules are obtained from spraying a liquid mixture at an elevated temperature and evaporating, if present, the dispersing agent (e.g., surfactant) and solvent. According to a preferred submerged granulating method, a liquid mixture is added to a heated agent that is not miscible with the liquid mixture. The contact results in the formation of spheres of the liquid mixture.

Carbonization may be performed by a heat-treatment using any temperature sufficient for carbonization. Preferably, the heat-treatment occurs in an inert gas atmosphere at from about 400° C. to less than 800° C., for example, at a temperature of from about 400° C. to about 700° C., or 400° C. to 790° C. More preferably, the carbonization temperature to which the granulated carbonaceous particle-containing material is heated, is in the range of from about 400° C. to about 600° C. Depending upon the particular synthetic resin and pitch components used, the conditions for carbonization can vary, but preferably are sufficient to carbonize the synthetic resin and/or pitch component without compromising the yield and strength of the packing material. Preferably, heat-treatment occurs under a pressure of from about 1 to about 8 kgf/cm$^2$G though other pressures can be used.

The granulated particles obtained are preferably composite bodies containing the carbonaceous particles and an agent that upon carbonization aids in forming a granule of high crush strength. The agent preferably acts as a binder and includes the carbonized product of a synthetic resin, pitch component, or synthetic resin/pitch component mixture. The granules preferably have a $L_{min}/L_{max}$ ratio of from about 0.75 to about 1.25, for example, a ratio of from about 0.90 to about 1.0. A preferred $L_{min}/L_{max}$ ratio is from about 0.95 to about 1.0. The granules preferably have a particle diameter of from about 1 to about 200 μm, a highly porous surface, a specific surface area of from about 10 to about 650 m$^2$/g, preferably from about 15 to about 550 m$^2$/g, a total micropore volume of from about 0.01 to about 2.0 ml/g, preferably 0.3 to about 2.0 ml/g, and a $V_{0.5}/V_{1.0}$ ratio of about 0.4 or smaller, preferably 0.2 or smaller, wherein $V_{0.5}$ is the gas adsorption volume at a relative pressure $P/P_0$ of 0.5 and $V_{1.0}$ is the nitrogen gas adsorption volume at a relative pressure $P/P_0$ of about 1.0 at nitrogen gas adsorption isotherm. The particles preferably have a particle size of from about 2 to about 5 microns, and other ranges below and above this range can be made.

The granules can be surface modified by attaching (e.g., covalently bonding) organic groups to the surface. The organic group is preferably at least one $C_1$–$C_{100}$ alkyl group and/or at least one aromatic group, an aliphatic group, a cyclic organic group, or an organic compound having an aliphatic portion and a cyclic portion. Preferably, the organic group is directly attached to the granules. A preferred set of organic groups which may be attached to the carbonaceous material, such as carbon black-containing granules, are organic groups substituted with an ionic or an ionizable group as a functional group. The ionic group may preferably be an anionic group or a cationic group and the ionizable group may form an anion or a cation. Examples of organic groups are described in U.S. patent application Ser. No. 09/654,182 and its continuation in part filed Aug. 31, 2001 both incorporated in their entirety by reference herein.

Preferably, the organic group contains an aromatic group such as a phenyl or a napthyl group and a quaternary ammonium or a quaternary phosphonium group. The aromatic group is preferably directly attached to the carbonaceous particle-containing granule.

In one embodiment, the carbonizable binder or carbonizable synthetic resin or carbonizable pitch component are attached onto carbonaceous particles to form the granulated product of the present invention.

A combination of different organic groups is also possible. For instance, it is within the bounds of the present invention to attach more than one type of organic group to the same granule or use a combination of granules, wherein some of the granules have been modified with one organic group and another portion of the granules has been modified with a different organic group. Varying degrees of modification are also possible, such as low weight percent or surface area modification, or a high weight percent or surface area modification. Also, mixtures of modified carbonaceous granules and unmodified carbonaceous granules can be used.

Preferably, the modified carbonaceous granules of the present invention, especially when the attached organic group is a phenyl or naphthyl group having substituents like sulfonic acid, carboxylic acid, or quaternary ammonium or salts thereof, can be directly analogous to polymeric ion exchange resins. These types of carbonaceous granules of the present invention can have one or more of the following properties as compared to conventional polymeric ion exchangers:

a) higher temperature stability;

b) greater resistance to swelling; and c) greater mechanical strength without adversely affecting uptake kinetics.

Furthermore, the modified carbonaceous granules of the present invention, besides being used as adsorbents, can also be used in separations ranging from water treatment to metals separation/recovery, ion exchange, catalysis, and the like. An additional advantage of an adsorbent possessing exchangeable groups as described above is that it confers on the granules the ability to be further surface modified using ion exchange procedures.

The granules of the present invention can be used in a number of applications, for example, as a stationary phase for chromatographic separations. Typically, a chromatographic system contains a mobile phase, a stationary phase, a pumping system, and a detector. Generally, the stationary phase contains insoluble particles which are preferably spherical and/or preferably range in size from about 2 microns to about 300 microns, more preferably from about 2 to about 5 microns. The choice of these particles depends on the physical, chemical, and/or biological interactions that need to be exploited by the separation. Conventional stationary phases, such as silica, agarose, polystyrene-divinylbenzene, polyacrylamide, dextrin, hydroxyapatite, cross-linked polysaccharides, and polymethacrylates are functionalized with certain groups in order to accomplish the selective separation of particular chemical compounds from a mixture. The precise functional groups that accomplish this desired specification are set forth, for instance, in Garcia, Bonen et al., "Bioseparation Process Science," Blackwell Science (1999), incorporated herein in its entirety by reference (hereinafter "Garcia et al.").

Another form of separation is electrophoresis which uses an applied electric field to produce directed movement of charged molecules. The process is similar to chromatographic methods in that a fixed barrier phase or stationary phase is used to facilitate separation. In the present invention, electrophoresis can be accomplished by using a stationary phase which contains the carbonaceous materials of the present invention.

Similarly, magnetic separations, such as magnetic bio-separations, can be accomplished using the carbonaceous materials of the present invention as the stationary phase.

In addition, membrane separations, such as reverse osmosis, can be accomplished by forming the membrane such that it contains carbonaceous materials. The membrane can be formed by dispersing the carbonaceous material in a polymer and casting the polymer mixture to form a membrane.

Generally, any separation technique which involves the use of a stationary phase can be improved by the present invention. In particular, the stationary phase can be or can contain the carbonaceous granules of the present invention. Upon knowing the desired chemical compound or species to be separated, the carbonaceous granules can be tailored to be selective to the targeted chemical species by attaching an organic group or organic groups onto the carbonaceous granules to suit the separation needed. Since many functional groups are known to cause particular selectivity in separations, these groups can be attached onto the carbonaceous granules to form the modified carbonaceous granules of the present invention and achieve the desired selectivity for separation processes.

In one embodiment, an adsorbent composition of the present invention contains modified carbonaceous granules capable of adsorbing an adsorbate wherein at least one organic group is attached to the carbonaceous granules.

As a separate embodiment, the present invention further relates to a granulated carbonaceous product which contains carbonaceous particles and at least one binder which can be carbonizable. The granulated carbonaceous product in this embodiment is produced by the process of mixing the carbonaceous particles with at least one binder and preferably an aqueous solvent or nonaqueous solvent. The mixture is then granulated to form granules and then the granules are heated at a temperature below the temperature to carbonize the binder that is present. Preferably, the granules are heated at a temperature of from about 150° C. to about 250° C. In this process, the uncarbonized particles that are formed contain a cured/crosslinked polymer binder which is present on the granules and are useful in such applications as adsorption and chromatography.

As indicated above, once the desired separation technique is chosen and the particular chemical species preferably known, a particular functional group or multiple functional groups can be chosen to be attached onto the carbonaceous material in order to accomplish the selectivity needed to conduct the separation process. For instance, as set forth in Garcia et al., heparin is used in the separation of lipoproteins, accordingly, heparin can be attached onto carbonaceous material in order to accomplish the desired separation. Similarly, when cationic exchange processes are needed, a sulfonic acid, for instance, can be attached on a carbonaceous material and when anionic exchanges are needed, a quaternary amine can be attached onto the carbonaceous material. Thus, with the present invention, and the knowledge possessed by one skilled in the art, separation techniques can be conducted using modified carbonaceous material to achieve the selectivity desired. Thus, the present invention provides a carbonaceous material which is resistant to corrosion, swelling, and/or extreme temperatures and pressures, but also provides the desired selectivity. In essence, the present invention gives the separation field the best of both worlds, namely, selectivity combined with a resilient stationary phase.

The granules of the present invention can preferably be used as a packing material or stationary phase material for chromatography. For example, a chromatographic column, such as a liquid chromatographic column, is packed with at least the packing material of the present invention. Then, a sample containing two or more components to be separated is passed, flowed, or otherwise forced through the packed column. Due to the independent affinities of the sample components, and the retention properties of the packing material with respect to the individual sample components, chemical separation of the components is achieved as the sample passes through the packed column. The packing material is also useful in gas chromatographic, high performance liquid chromatographic, solid phase extraction, and other chromatographic separation techniques.

The present invention will be further clarified by the following examples, which are intended to be purely exemplary of the present invention.

EXAMPLE 1

Preparation of Carbonized Porous Particles (SP-1)

600 g of Vulcan-6™ carbon black were placed inside a pin-mixer. 520 g deionized water and 180 g of Rutgers-Plenco Resin 12868 were blended together. The mixture was subsequently injected into the pin mixer while it was running at 100 rpm. After the end of the addition of the liquid phase, the speed of the mixer was increased to 1000 rpm and held at that speed for 1 minute. The particles were then discharged from the mixer and dried at 180° C. overnight in order to both remove the excess water and cure the phenolic resin. The particles were then classified by screening. The fraction held between the 120 mesh and 325 mesh screens with particles sizes ranging between 45 and 125 microns was separated. This fraction was then placed in a tube furnace and ramped to 650° C. in 4 hours and then held at 650° C. for an additional hour under nitrogen. These particles (SP-1) were found to have a BET $N_2$ surface area of 138 $m^2/g$ and a t-surface area of 61.5 $m^2/g$.

EXAMPLE 2

Preparation of Surface Modified Carbonized Porous Particles (SP-2)

0.76 g of sulfanilic acid were mixed with 100 ml of deionized water and subsequently heated to 60° C. 10 g of the SP-1 particles were added to the mixture and stirred for 5 minutes. Subsequently, 1.5 g of a 20% solution of $NaNO_2$ in water were added to the mixture to initiate the treatment reaction. The mixture was reacted at 60° C. for 1 hour and then left to cool down to room temperature. The surface modified particles (SP-2) were then filtered out of the reaction medium, washed with a 1% NaOH solution, water, and ethanol and soxhlet extracted for 12 hours in ethanol. The efficiency of the surface modification is shown by the increase in the sulfur content of the particles after surface modification. The sulfur content of the starting particles SP-1 was 0.9 wt % and the sulfur content of the particles after surface modification was 1.38%. The increase in sulfur content is due to the attachment of benzenesulfonate groups to the surface of the particles.

EXAMPLE 3

Preparation of Polymer Bound Porous Carbon Based Particles (SP-3)

7.6 liters of a Cabojet-300™ aqueous dispersion of benzoic acid modified carbon black were placed in a holding tank. 166.7 g of Dynachem Phenalloy 2175 phenolic resin were mixed in. The mixture was spray dried at 110 ml/min through a 2-fluid nozzle. The dry particles were collected, and subsequently cured at 180° C. for 4 hours under nitrogen. The resulting particles SP-3 had a BET $N_2$ surface area of 126.8 $m^2/g$ and a t-surface area of 106.2 $m^2/g$.

EXAMPLE 4

Preparation of Benzenesulfonic Acid Surface Modified Polymer Bound Porous Carbon Based Particles (SP-4)

1.384 g of sulfanilic acid were mixed with 50 ml of deionized water in a beaker and heated to 60° C. 5 g of SP-3 particles were added to the mixture. 2.76 g of a 20% solution of sodium nitrite in water were added slowly, and the mixture was left to react for 90 minutes. The reaction mixture was filtered and the particles were reslurried and washed with a 1% NaOH solution in water. The particles were refiltered and washed with deionized water, and subsequently washed with ethanol and tetrahydrofuran. The particles were soxhlet extracted in ethanol overnight. The starting sulfur content of the particles was 0.39 wt %. After the surface modification the sulfur content was 1.39 wt % indicating the attachment of benzenesulfonic groups.

EXAMPLE 5

Preparation of Porous Carbon Particles (SP-5)

80 g of particles SP-3 were heated under nitrogen in a tube furnace to 700° C. and held at that temperature for 2 hours. The particles were then cooled to room temperature. A SEM picture of these particles is shown in FIG. 1.

EXAMPLE 6

Preparation of Benzenesulfonic Acid Surface Modified Porous Carbon Particles (SP-6)

1.384 g of sulfanilic acid were mixed with 30 ml of deionized water in a beaker and heated to 60° C. 5 g of SP-5 particles were added to the mixture. 2.76 g of a 20% solution of sodium nitrite in water were added slowly and the mixture was left to react for 90 minutes. The reaction mixture was filtered and the particles were reslurried and washed with a 1% NaOH solution in water. The particles were refiltered and washed with deionized water, and subsequently washed with ethanol. The particles were soxhlet extracted in ethanol overnight. The starting sulfur content of the particles was 0.36 wt %. After the surface modification the sulfur content was 1.79 wt % indicating the attachment of benzenesulfonic groups.

EXAMPLE 7

Preparation of Octadecylphenyl Surface Modified Porous Carbon Particles (SP-7)

5.07 g of 4-octadecylaniline were mixed with 22 ml of deionized water, 50 g of ethanol, and 6.17 g of a 30% aqueous solution of $HNO_3$ in a beaker and heated to 50° C. 15 g of particles (made in a similar manner as in Example 5, except heated under nitrogen in a tube furnace to 900° C.) were added to the mixture. 5.07 g of a 20% solution of sodium nitrite in water were added slowly and the mixture was left to react for 90 minutes. The reaction mixture was filtered and the particles were reslurried and washed with ethanol. The particles were refiltered and washed with a sodium hydroxide solution, tetrahydrofuran and ethanol. The particles were first soxhlet extracted in ethanol overnight and then extracted in a Dionex ASE-300 extractor with ethanol and a 50/50 ethanol/tetrahydrofuran mixture and left to dry. After the surface modification the volatile content of the particles was 7.59 wt % indicating the attachment of octadecylphenyl groups.

Other embodiments of the present invention will be apparent to those skilled in the art from consideration of the present specification and practice of the present invention disclosed herein. It is intended that the present specification be considered as exemplary only with a true scope and spirit of the invention being indicated by the following claims and equivalents thereof.

What is claimed is:

1. A method of chromatographic separation or solid phase extraction comprising passing a sample having components to be separated through a plurality of granulated products comprising carbonaceous particles and at least one carbonized synthetic resin, carbonized pitch component, or mixtures thereof, wherein said granulated product has attached at least one organic group.

2. The method of claim 1, wherein said chromatographic separation or solid phase extraction is a liquid chromatographic separation or solid phase extraction.

3. The method of claim 1, wherein said carbonaceous particles have a specific surface area of from about 15 to about 550 $m^2/g$ and a total inicropore volume of from about 0.01 to about 2.0 ml/g.

4. The method of claim 1, wherein said granulated product has a ratio $V_{0.5}/V_{1.0}$ of about 0.4 or smaller, wherein $V_{0.5}$ is the nitrogen gas adsorption volume at a relative pressure P/P$_0$ of 0.5 and V$_{1.0}$ is the nitrogen gas adsorption volume at a relative pressure P/P$_0$ of about 1.0 at a nitrogen gas adsorption isotherm.

5. The method of claim 1, wherein said carbonaceous particles are carbon black particles.

6. The method of claim 1, wherein said granulated product comprises a carbonized synthetic resin and said synthetic resin is a phenol resin, a furan resin, a furfural resin, a divinyl benzene resin, a urea resin, or a combination thereof.

7. The method of claim 1, wherein said granulated product comprises a carbonized pitch component and said pitch component is at least one of a toluene-soluble pitch component or a beuzene-soluble pitch component, or a combination thereof.

8. The method of claim 7, wherein said pitch component comprises a petroleum pitch, a coal-tar pitch, a liquefied coal oil, or a combination thereof.

9. The method of claim 1, wherein said carbonaceous particles comprise 100 parts by weight carbon black and said mixture comprises from about 5 to about 500 parts by weight said synthetic resin, pitch component, or both.

10. The method of claim 1, wherein said organic group contains an ionic group or an ionizable group.

11. The method of claim 1, wherein said carbonaceous particles are substantially spherical.

12. The method of claim 1, wherein said carbonaceous particles are aggregates comprising a carbon phase and a silicon-containing species phase.

13. The method of claim 1, wherein said carbonized synthetic resin, carbonized pitch component, or carbonized synthetic resin/pitch component mixture has been carbonized by heating to a temperature of from about 400° C. to less than 800° C.

14. The method of claim 1, wherein said carbonized synthetic resin, carbonized pitch component, or carbonized synthetic resin/pitch component mixture has been carbonized by heating to a temperature of from about 400° C. to about 700° C.

* * * * *